(12) United States Patent
Lee et al.

(10) Patent No.: US 10,785,252 B2
(45) Date of Patent: Sep. 22, 2020

(54) APPARATUS FOR ENHANCING NETWORK SECURITY AND METHOD FOR THE SAME

(71) Applicant: Electronics and Telecommunications Research Institute, Daejeon (KR)

(72) Inventors: Jooyoung Lee, Daejeon (KR); Dae-Sung Moon, Daejeon (KR); Kyung-Min Park, Daejeon (KR); Samuel Woo, Daejeon (KR); Ho Hwang, Daegu (KR); Ik-Kyun Kim, Daejeon (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 15/985,452

(22) Filed: May 21, 2018

(65) Prior Publication Data
US 2019/0052663 A1    Feb. 14, 2019

(30) Foreign Application Priority Data

Aug. 10, 2017    (KR) .......................... 10-2017-0101671

(51) Int. Cl.
*H04L 29/06*    (2006.01)

(52) U.S. Cl.
CPC ...... *H04L 63/1433* (2013.01); *H04L 63/1425* (2013.01); *H04L 63/20* (2013.01)

(58) Field of Classification Search
CPC . H04L 63/1416; H04L 63/20; H04L 63/1425; H04L 63/1433; H04L 63/1441; G06F 21/577
See application file for complete search history.

(56) References Cited

U.S. PATENT DOCUMENTS

| 7,013,395 | B1 | | 3/2006 | Swiler et al. |
| 7,440,573 | B2 | * | 10/2008 | Lor .................. H04L 63/107 380/270 |
| 8,146,160 | B2 | * | 3/2012 | Orr .................... H04L 63/0209 713/168 |
| 9,392,007 | B2 | * | 7/2016 | Giokas ............... H04L 63/1416 |
| 9,418,040 | B2 | * | 8/2016 | Cordray ................ H04L 41/20 |
| 9,460,286 | B1 | * | 10/2016 | Felstaine ............ H04L 63/1441 |

(Continued)

FOREIGN PATENT DOCUMENTS

| KR | 10-2004-0022112 A | 3/2004 |
| KR | 10-2004-0027101 A | 4/2004 |

(Continued)

*Primary Examiner* — Hosuk Song
(74) *Attorney, Agent, or Firm* — NSIP Law (57) ABSTRACT

Disclosed herein is an apparatus for enhancing network security, which includes an information collection unit for collecting information about states of hosts that form a network and information about connectivity in the network; an attack surface analysis unit for analyzing attack surfaces by creating an attack graph using the information about the states and the information about connectivity; a security-enhancing strategy establishment unit for establishing a security-enhancing strategy based on the attack graph; and a security-enhancing strategy implementation unit for delivering a measure based on the security-enhancing strategy to a corresponding host, thereby taking a security-enhancing measure.

21 Claims, 9 Drawing Sheets

(56) References Cited

U.S. PATENT DOCUMENTS

| | | | |
|---|---|---|---|
| 9,692,779 B2 | | 6/2017 | Maeng et al. |
| 9,729,560 B2 * | | 8/2017 | Wang .................... H04L 43/026 |
| 9,912,679 B1 * | | 3/2018 | Felstaine ............ H04L 63/1441 |
| 2004/0168085 A1 | | 8/2004 | Omote et al. |

FOREIGN PATENT DOCUMENTS

| KR | 10-2011-0130203 A | 12/2011 |
|---|---|---|
| KR | 10-1442691 B1 | 9/2014 |

* cited by examiner

APPARATUS FOR ENHANCING NETWORK SECURITY AND METHOD FOR THE SAME

CROSS REFERENCE TO RELATED APPLICATION

This application claims the benefit of Korean Patent Application No. 10-2017-0101671, filed Aug. 10, 2017, which is hereby incorporated by reference in its entirety into this application.

BACKGROUND OF THE INVENTION

1. Technical Field

The present invention relates to an apparatus and method for enhancing network security in which attack surfaces of hosts on a network are analyzed, hosts, the security of which has to be enhanced, are identified, and the security of the corresponding hosts is enhanced.

2. Description of the Related Art

Most organizations make a lot of effort to construct security systems and to enhance security in order to prepare for cyberattacks. Despite these efforts, organizations are frequently exposed to cyberattacks and damaged thereby. This is because hackers make an attack after scrutinizing targets and establishing a systematic strategy. However, in many cases, organizations are damaged because a strategy for resolving already known vulnerabilities is not taken due to the difficulty of management in organizations, or because careless network and security configurations are made.

Also, it is almost impossible for security managers to thoroughly investigate the exponentially increasing number of IT devices, software installed therein, and configuration information and to manage them so as to be optimized for security. In other words, it is difficult to detect the total vulnerabilities from the comprehensive view.

As the conventional method for solving this problem, a vulnerability-scanning solution is provided. This vulnerability-scanning tool is configured such that whether a host has vulnerabilities is determined using data collected over a network and such that a list of the found vulnerabilities is provided. However, because this method merely notifies security managers of the vulnerabilities, when there is a large number of hosts to manage, it is difficult for the security managers to select the hosts to process and determine how to process the hosts in order to effectively respond to cyber threats. Therefore, the vulnerability-scanning tool is not sufficient to achieve the purpose of maintaining optimized security. Also, it is inefficient to process a number of found vulnerabilities one by one. In connection with this, Korean Patent No. 10-1442691 discloses a technology related to "Apparatus and method for quantifying vulnerability of system."

The above-described information about the related art has been retained by the inventors for the purpose of developing the present invention or was obtained during the process of developing the present invention. Also, it should be appreciated that this information did not necessarily belong to the public domain before the patent filing date of the present invention.

SUMMARY OF THE INVENTION

An object of the present invention is to provide an apparatus and method for enhancing network security in which attack surfaces of hosts on a network are analyzed, hosts, the security of which has to be enhanced, are identified, and the security of the corresponding hosts is enhanced.

An embodiment of the present invention provides an apparatus for enhancing network security, which includes an information collection unit for collecting information about states of hosts that form a network and information about connectivity in the network; an attack surface analysis unit for analyzing attack surfaces by creating an attack graph using the information about the states and the information about connectivity; a security-enhancing strategy establishment unit for establishing a security-enhancing strategy based on the attack graph; and a security-enhancing strategy implementation unit for delivering a measure based on the security-enhancing strategy to a corresponding host, thereby taking a security-enhancing measure.

Here, the apparatus may further include a vulnerability database for storing vulnerability data, and the attack surface analysis unit may use the vulnerability data stored in the vulnerability database when creating the attack graph.

Here, the information collection unit may again collect information about states of the hosts and information about connectivity in the network after the security-enhancing measure is taken, whereby attack surfaces may be analyzed again and a measure for responding thereto may be taken.

Here, the attack surface analysis unit may create nodes by identifying vulnerabilities of the hosts and draw an edge to connect nodes that are associated with each other using the connectivity information when creating the attack graph.

Here, the security-enhancing strategy establishment unit may set a priority order of respective nodes in the attack graph using at least one of topology importance evaluated from an aspect of topology, an impact of each vulnerability, and importance of a host, and may establish the security-enhancing strategy using the priority order.

Here, the security-enhancing strategy implementation unit may determine whether to take a measure based on the security-enhancing strategy and which strategy to take, either automatically or depending on input from a user.

Here, the security-enhancing strategy implementation unit may provide available solutions to the user and take a measure based on a solution selected depending on the input from the user.

Here, the vulnerability database may collect vulnerability data from other vulnerability databases and store the collected vulnerability data therein.

Here, the attack surface analysis unit may use attack scenarios when creating the attack graph, and the attack scenarios may be configured by combining conditions that are exploitable by an attacker at an outset of an attack with final attack targets.

Here, the attack scenarios may be specified by user input, or may be automatically created using a combination of hosts on the network.

Another embodiment of the present invention provides a method for enhancing network security, which includes collecting information about states of hosts that form a network and information about connectivity in the network; analyzing attack surfaces by creating an attack graph using the information about the states and the information about connectivity; establishing a security-enhancing strategy based on the attack graph; and delivering a measure based on the security-enhancing strategy to a corresponding host, thereby taking a security-enhancing measure.

Here, analyzing the attack surfaces may be configured to use vulnerability data stored in a vulnerability database when the attack graph is created.

Here, collecting the information may be configured to again collect information about states of the hosts and information about connectivity in the network after the security-enhancing measure is taken, whereby attack surfaces may be analyzed again and a measure for responding thereto may be taken.

Here, analyzing the attack surfaces may be configured to create nodes by identifying vulnerabilities of the hosts and to draw an edge to connect nodes that are associated with each other using the connectivity information when the attack graph is created.

Here, establishing the security-enhancing strategy may be configured to set a priority order of respective nodes in the attack graph using at least one of topology importance evaluated from an aspect of topology, an impact of each vulnerability, and importance of a host, and to establish the security-enhancing strategy using the priority order.

Here, taking the security-enhancing measure may be configured to determine whether to take a measure based on the security-enhancing strategy and which strategy to take, either automatically or depending on input from a user.

Here, taking the security-enhancing measure may be configured to provide available solutions to the user and to take a measure based on a solution selected depending on the input from the user.

Here, the vulnerability database may collect vulnerability data from other vulnerability databases and store the collected vulnerability data therein.

Here, analyzing the attack surfaces may be configured to use attack scenarios when the attack graph is created, and the attack scenarios may be configured by combining conditions that are exploitable by an attacker at an outset of an attack with final attack targets.

Here, the attack scenarios may be specified by user input, or may be automatically created using a combination of hosts on the network.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed, and may have various embodiments, and specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, but all or some of the embodiments may be selectively combined and configured, so that the embodiments may be modified in various ways. It will be understood that, although the terms "first," "second," etc. may be used herein to describe various elements, these elements are not intended to be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
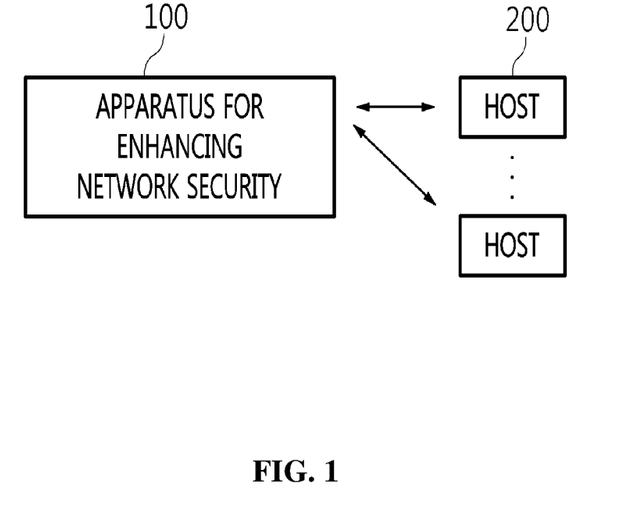
FIG. 1 is a view that shows the configuration of a system for enhancing network security according to an embodiment of the present invention.

FIG. 1 is a view that shows the configuration of a system for enhancing network security according to an embodiment of the present invention.

Referring to FIG. 1, in the system 1 for enhancing network security, an apparatus 100 for enhancing network security is interconnected with one or more hosts 200.

The apparatus 100 for enhancing network security according to an embodiment of the present invention collects information about states of hosts forming a network and information about connectivity in the network, analyzes attack surfaces by creating an attack graph using the state information and the connectivity information, establishes a security-enhancing strategy based on the attack graph, and delivers a measure based on the security-enhancing strategy to a corresponding host, thereby taking a security-enhancing measure.

Here, the apparatus 100 for enhancing network security may determine whether to take the measure based on the security-enhancing strategy, either automatically or depending on user input.

In an alternative embodiment, the apparatus 100 for enhancing network security may create an attack graph using vulnerability data stored in a vulnerability database, and may analyze attack surfaces.

Here, the apparatus 100 for enhancing network security may collect vulnerability data from other open vulnerability databases, and may store the collected data in the vulnerability database.

Here, an attack graph is a model through which routes along which an attacker accesses a target system inside a network are provided in a probabilistic manner. Here, whether the current network lacks security features may be determined based on the attack graph.

The representative research on attack graphs was conducted by Sushil Jajodia and Steven Noel. Here, an attack graph is created in such a way that information that can be used by an attacker, such as exploits and security conditions, is modeled as a node, and that interdependency between nodes, which is determined based on the preconditions and postconditions of each node, is represented as an edge. Then, an attack route may be derived from a list of security conditions acquired from the attack graph. Also, in the process in which an attacker accesses a system having a vulnerability and reaches a final destination via another system, a Bayesian network, Markov modeling, or the like may be used to calculate a probability that indicates the relative difficulty of an attack at each step.

That is, attack surfaces are analyzed using an attack graph, and the probability that an attacker is capable of reaching a destination based on vulnerabilities on a network is provided, whereby how vulnerable the corresponding network is to attacks may be easily detected.

In an alternative embodiment, the apparatus 100 for enhancing network security again collects information about the states of hosts and information about connectivity in the network after a security-enhancing measure is taken, whereby attack surfaces may be analyzed again, and a security-enhancing measure for responding thereto may be taken.

In an alternative embodiment, the apparatus 100 for enhancing network security may create an attack graph in such a way that nodes are created by identifying vulnerabilities of hosts and an edge connects nodes that are associated with each other using connectivity information.

In an alternative embodiment, the apparatus 100 for enhancing network security may set a priority order of nodes in an attack graph using at least one of the topology importance, evaluated from the aspect of topology, the impact of each vulnerability, and the importance of a host, and may establish a security-enhancing strategy using the priority order.

In an alternative embodiment, the apparatus 100 for enhancing network security may provide available solutions to a user, and may take an action based on the security-enhancing strategy that is established depending on the solution selected by the user.

In an alternative embodiment, the apparatus 100 for enhancing network security may use attack scenarios when it creates an attack graph.

Here, the attack scenarios may be configured by combining final attack targets with conditions that can be exploited by an attacker when the attack is started.

Here, the attack scenarios may be specified depending on user input, or may be automatically created using a combination of hosts on a network.

Accordingly, information about the states of hosts on a network and information about connectivity in the network are continually collected, attack surfaces are analyzed based thereon, and a strategy for responding thereto is established and implemented, whereby network security may be efficiently enhanced.

Also, in the case of existing methods, security assessment is not performed well after a security strategy or system is applied. However, in the method according to the present invention, security assessment is automatically performed when a change is caused in a host, a network, or vulnerability data, and a solution for responding thereto is implemented, whereby security may be continually and dynamically enhanced.

Each of the hosts 200 may be a computer that forms a network.

Here, the host 200 may include a server or a client.

Here, the host 200 may provide information about the state thereof in response to a request from the apparatus 100 for enhancing network security, and may implement a security-enhancing strategy by receiving an instruction for executing the security-enhancing strategy from the apparatus 100 for enhancing network security.

Figure 2:
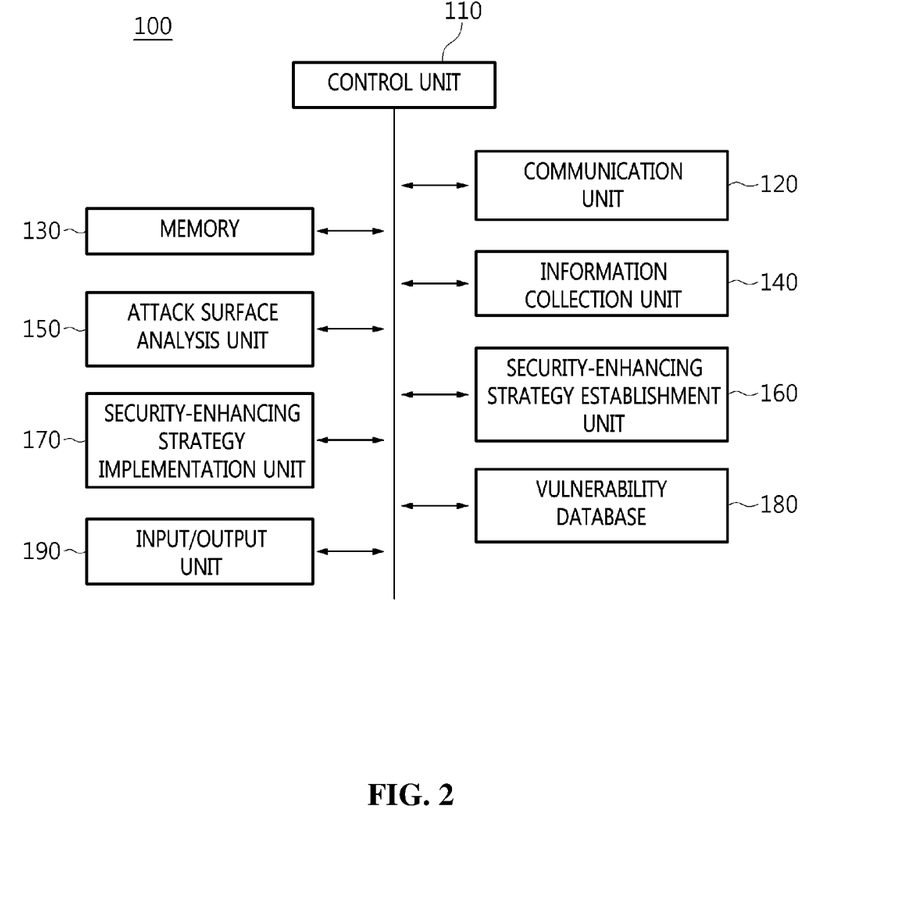
FIG. 2 is a block diagram that shows an example of the apparatus for enhancing network security illustrated in FIG. 1.

FIG. 2 is a block diagram that shows an example of the apparatus 100 for enhancing network security, illustrated in FIG. 1.

Referring to FIG. 2, the apparatus 100 for enhancing network security according to an embodiment of the present invention includes a control unit 110, a communication unit 120, memory 130, an information collection unit 140, an attack surface analysis unit 150, a security-enhancing strategy establishment unit 160, a security-enhancing strategy implementation unit 170, a vulnerability database 180, an input/output unit 190, and the like.

Specifically, the control unit 110 is a kind of central processing unit, and controls the overall process of enhancing network security. That is, the control unit 110 may provide various functions by controlling the information collection unit 140, the attack surface analysis unit 150, the security-enhancing strategy establishment unit 160, the security-enhancing strategy implementation unit 170, the vulnerability database 180, the input/output unit 190, and the like.

Here, the control unit 110 may include all kinds of devices capable of processing data, such as a processor and the like. Here, the term 'processor' may indicate, for example, a data-processing device embedded in hardware, which has a circuit physically structured for performing functions represented as code or instructions included in a program. An example of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The communication unit 120 provides a communication interface that is necessary in order to send or receive signals between the apparatus 100 for enhancing network security and hosts (200 in FIG. 1).

Here, the communication unit 120 may be a device including hardware and software that are necessary in order to send and receive signals, such as control signals or data signals, through a wired or wireless connection with another network device.

The memory 130 functions to temporarily or permanently store data processed by the control unit 110. Here, the memory 130 may include magnetic storage media or flash storage media, but the present invention is not limited thereto.

The information collection unit 140 collects information about the current states of hosts (200 in FIG. 1) that form a network and information about network connectivity between the hosts (200 in FIG. 1).

That is, the information collection unit 140 may collect information about network connectivity between one or more hosts (200 in FIG. 1) that constitute IT infrastructure in the internal network of an organization, and may receive state information from each of the hosts (200 in FIG. 1).

Here, the host state information to be collected includes the type of host (for example, a terminal, a router, a switch, or the like), a host name, a host Internet Protocol (IP) address, a host Media Access Control (MAC) address, a host OS, a host service port, applications installed in the host, and the like.

Here, for software including OSs and applications, additional information, such as a software type (for example, an OS, an application, a database, a security program, or the like), a vender, a version, update information, and a programming language, may be acquired.

Here, the network connectivity information indicates whether it is possible to transmit traffic between hosts, and network connectivity may be represented as a pair comprising the interface of a source host, from which traffic is to be transmitted, and information about the port of a destination host.

Here, after the security-enhancing strategy implementation unit 170 takes a security-enhancing measure, the information collection unit 140 again collects information about the states of the hosts (200 in FIG. 1) and information about network connectivity, thereby again analyzing attack surfaces and taking an action for responding thereto.

That is, when the apparatus 100 for enhancing network security recognizes that host state information or network connectivity information is changed depending on the security-enhancing measure, the information collection unit 140 collects information again, the attack surface analysis unit 150 creates an attack graph from scratch or reconfigures only the changed part of the attack graph, and the security-enhancing strategy establishment unit 160 reestablishes a network-security-enhancing strategy and takes an action based thereon, whereby the security-enhancing process may be automated and network security may be constantly enhanced.

The attack surface analysis unit 150 creates an attack graph using the collected host state information and network connectivity information and analyzes attack surfaces using the attack graph.

Here, the attack surface analysis unit 150 may collect and use vulnerability data stored in the vulnerability database when it creates an attack graph.

Here, the vulnerability data may include Common Vulnerabilities and Exposure Identification (CVE ID), Common Weakness Enumeration (CWE), reference, confidentiality, integrity, exploitability impact, information about components having vulnerabilities (for example, a software type, a vendor, a version, update information, a development language, and the like), access information (for example, complexity, a network, an adjacent network, a local network, an authentication method, and the like), a vulnerability summary, the release date and time, the change date and time, the final change date and time, Common Vulnerability Scoring System (CVSS), and the like.

Here, the attack surface analysis unit 150 creates an attack graph, thereby searching for all routes that can be used by an attacker.

Here, the attack surface analysis unit 150 may create an attack graph in such a way that nodes are created by identifying vulnerabilities of hosts (200 in FIG. 1) and an edge connects nodes that are associated with each other using the connectivity information.

Here, the process of creating an attack graph may be configured with the step of identifying all vulnerabilities of the respective hosts (200 in FIG. 1) and the step of extracting actually exploitable vulnerabilities from the vulnerabilities identified using the network connectivity information, thereby deriving actually effective attack routes. That is, vulnerabilities that are present in the hosts (200 in FIG. 1) are identified by comparing information about software installed in the hosts (200 in FIG. 1) with data in the vulnerability database 180, and a pair comprising a corresponding host and each of the identified vulnerabilities may be represented as a single node. Then, when it is determined depending on the collected network connectivity information that there is connectivity between two nodes, an edge may connect the same.

Here, the attack surface analysis unit 150 may create and use attack scenarios when it creates an attack graph.

Here, the attack scenarios may be configured by combining conditions exploitable by an attacker at the outset of an attack (for example, administrative rights of access to a certain host) with the final attack targets (for example, administrative rights of access to a DB server).

Here, the attack scenarios may be specified depending on user input, or may be automatically created using a combination of hosts (200 in FIG. 1) on a network.

The security-enhancing strategy establishment unit 160 determines a method for effectively enhancing the security of the overall network based on the attack graph and establishes a strategy for enhancing security.

Here, the security-enhancing strategy establishment unit 160 may set a priority order of nodes included in the attack route derived from the attack graph in order to establish a security-enhancing strategy.

Here, the security-enhancing strategy establishment unit 160 may set a priority order of nodes in the attack graph using at least one of the topology importance $eval_{topol}$ evaluated from the aspect of topology, the impact of each vulnerability $eval_{vuln}$, and the importance of a host $eval_{host}$, and may establish a security-enhancing strategy using the priority order.

Here, $eval_{topol}$ is a value acquired by analyzing and evaluating the topology of each node on an attack route, and the betweenness centrality and eigenvector centrality of a corresponding node may be calculated and incorporated therein. Also, $eval_{vuln}$ is a value including the impact of a vulnerability mapped to a corresponding node, and the impact of a vulnerability may be acquired using a CVSS acquired from vulnerability data. Also, $eval_{host}$ is a value that represents how important the host, mapped to the corresponding node, is in an organization, and may have a preset reference value or a value given by a user.

Here, information about the priority order of each node may be used when a security manager selects an element, the security of which is to be effectively enhanced.

Here, when it sets the priority order of nodes, the security-enhancing strategy establishment unit 160 may use addition using a weight, as shown in the following Equation (1). That is, depending on the calculated security priority of each node, the host, the security of which is to be enhanced, and the priority order of vulnerability information may be determined.

$$\text{SecurityPriority(node)} = w_{topol} \times eval_{topol} + w_{vuln} \times eval_{vuln} + w_{host} \times eval_{host} \quad (1)$$

where $w_{topol}$, $w_{vuln}$, and $w_{host}$ denote the weights for $eval_{topol}$, $eval_{vuln}$, and $eval_{host}$, respectively.

Here, the respective weights may be set using preset reference values or values input by a user.

The security-enhancing strategy implementation unit 170 takes a security-enhancing measure by delivering the measure based on the security-enhancing strategy to a corresponding host.

Here, the security-enhancing strategy implementation unit 170 may automatically select the target to investigate using information about the priority order of the respective nodes, or may make a security manager select the target to investigate by providing information about the priority order to the security manager through the input/output unit 190.

Here, when it provides the information about the priority order to the security manager or a user through the input/output unit 190, the security-enhancing strategy implementation unit 170 may also provide the basis on which the target is identified as an attack surface (for example, the topology importance, the impact of a vulnerability, and the importance of a host), a visible attack route, methods for resolving the vulnerability, and the like.

That is, the security-enhancing strategy implementation unit 170 may provide a user with available solutions for enhancing security, and may take an action depending on the solution selected depending on user input.

Here, the security-enhancing strategy implementation unit 170 may operate in conjunction with the internal vulnerability database 180, an external vulnerability database, an expert system, or the like. For example, when software installed in a certain host has a vulnerability because it has not been updated to the latest version, it may be advised to install a necessary patch, or when a port is open due to a network configuration error, it may be advised to close the port in order to reduce network connectivity.

Here, the security-enhancing strategy implementation unit 170 may create a security-enhancing strategy execution instruction.

Here, the security-enhancing strategy implementation unit 170 delivers the security-enhancing strategy execution instruction to the hosts that are the targets of the security-enhancing strategy. This instruction may include a security-enhancing strategy that must be implemented by each host.

The vulnerability database 180 stores vulnerability data.

Here, the vulnerability database 180 may collect vulnerability data from other vulnerability databases periodically or in response to a request, and may store the collected vulnerability data. That is, the vulnerability database 180 maintains the latest vulnerability data by collecting vulnerability data.

Here, other vulnerability databases may be vulnerability databases that are open on the web.

The input/output unit 190 provides information to a user and receives a response thereto.

Here, the input/output unit 190 may output the result of analysis of attack surfaces, information about targets to be investigated for enhancing security, information about a priority order, information about solutions based on a security-enhancing strategy, and the like.

Here, the input/output unit 190 may receive weights to be used to calculate a priority order of each node, information about a selected target to be investigated, information about a selected solution, and the like from a user.

That is, the input/output unit 190 may function to receive user input that is necessary for the apparatus 100 for enhancing network security and to visualize and show the results calculated at each step.

Figure 3:
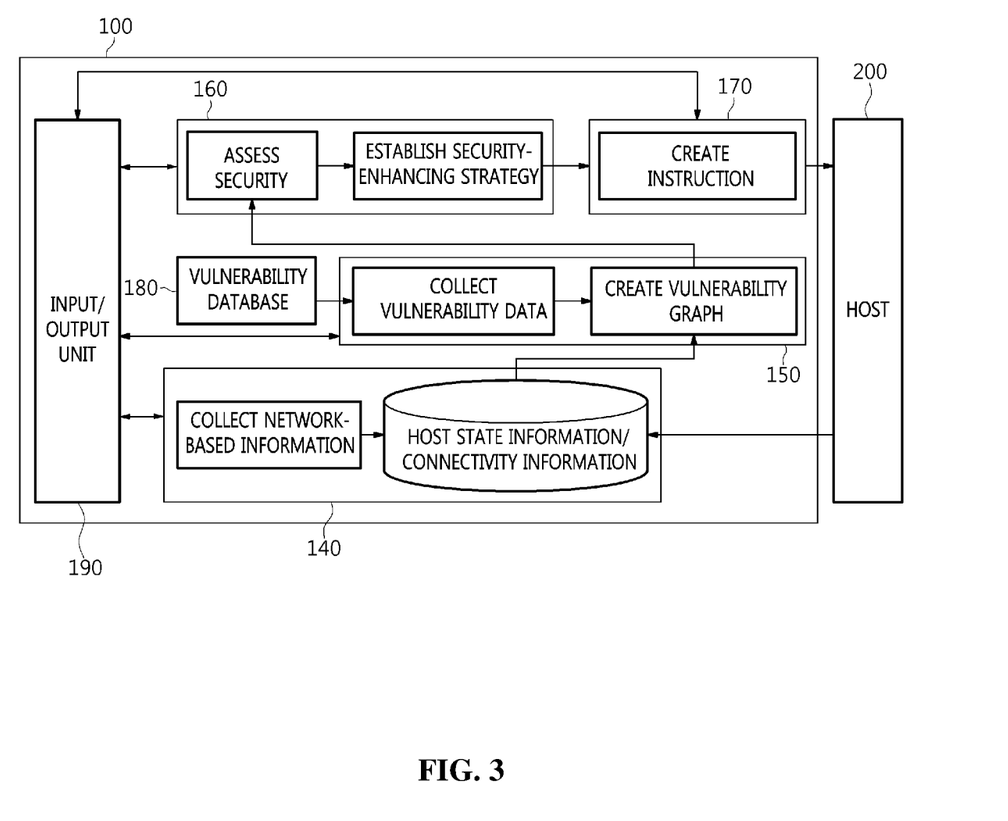
FIG. 3 is a view that shows an example of the internal components and functions of the apparatus for enhancing network security illustrated in FIG. 1.

FIG. 3 is a view that shows an example of the internal components and function of the apparatus 100 for enhancing network security, illustrated in FIG. 1.

Here, the internal components of the apparatus 100 for enhancing network security may be arranged in various locations on a network according to an embodiment.

Referring to FIG. 3, the apparatus 100 for enhancing network security includes an information collection unit 140, an attack surface analysis unit 150, a security-enhancing strategy establishment unit 160, a security-enhancing strategy implementation unit 170, a vulnerability database 180, an input/output unit 190, and the like.

The information collection unit 140 collects information about the states of hosts from the hosts 200 and acquires connectivity information by collecting network-based information.

The attack surface analysis unit 150 creates a vulnerability graph using the host state information and the connectivity information, which are collected by the information collection unit 140, and vulnerability data collected from the vulnerability database 180.

The security-enhancing strategy establishment unit 160 assesses the security of the hosts using the vulnerability graph created by the attack surface analysis unit 150 and establishes a security-enhancing strategy based on the assessment result.

The security-enhancing strategy implementation unit 170 creates an execution instruction corresponding to the security-enhancing strategy established depending on the method automatically selected by the security-enhancing strategy establishment unit 160 or selected depending on user input, and sends the execution instruction to a host, thereby taking a security-enhancing measure.

The input/output unit 190 may output the progress status or result information at each step by being connected with the information collection unit 140, the attack surface analysis unit 150, the security-enhancing strategy establishment unit 160, the security-enhancing strategy implementation unit 170, and the like.

Here, the input/output unit 190 may receive an attack scenario to be used to create a vulnerability graph and deliver the attack scenario to the attack surface analysis unit 150.

Here the input/output unit 190 may receive information about policies that are necessary when a security-enhancing strategy is established, and may deliver the received information to the security-enhancing strategy establishment unit 160.

Here, the input/output unit 190 may receive information about a selected target to be investigated, for which the security-enhancing strategy is to be implemented, or information about a selected solution, and may deliver the received information to the security-enhancing strategy implementation unit 170.

The host 200 receives an execution instruction from the security-enhancing strategy implementation unit 170 and parses the received execution instruction, thereby implementing the security-enhancing strategy.

Figure 4:
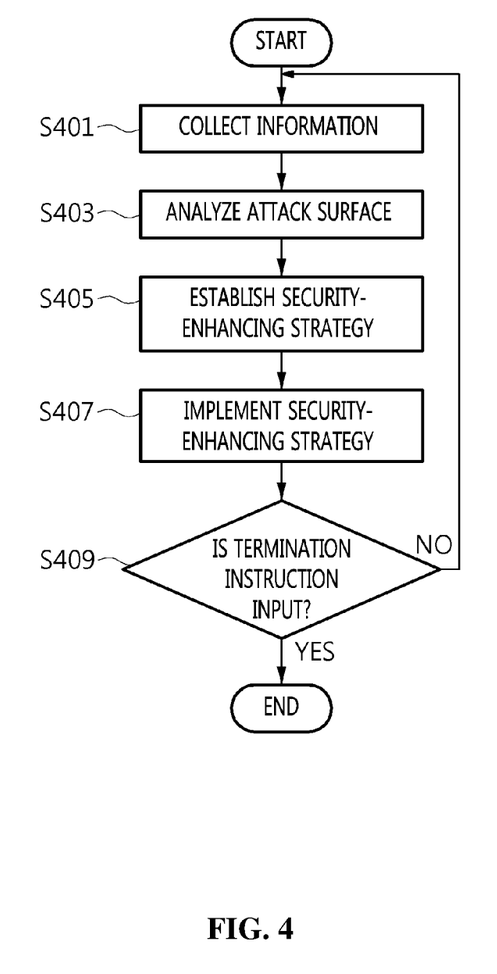
FIG. 4 is a flowchart that shows a method for enhancing network security according to an embodiment of the present invention.

FIG. 4 is a flowchart that shows a method for enhancing network security according to an embodiment of the present invention.

Referring to FIG. 4, in the method for enhancing network security according to an embodiment of the present invention, a network security enhancement apparatus (100 in FIG. 1) collects information in order to enhance security at step S401.

Here, the collected information may include information about the states of hosts that form a network and information about connectivity in the network.

Also, in the method for enhancing network security according to an embodiment of the present invention, the network security enhancement apparatus (100 in FIG. 1) analyzes attack surfaces using the collected information at step S403.

Here, an attack graph may be created in order to analyze attack surfaces, and the attack surfaces may be analyzed using the attack graph.

Here, the attack graph may be created using vulnerability data stored in a vulnerability database.

Also, in the method for enhancing network security according to an embodiment of the present invention, the network security enhancement apparatus (100 in FIG. 1) establishes a security-enhancing strategy at step S405 based on the analyzed attack surfaces.

Here, the security-enhancing strategy may be established based on the attack graph.

Here, the priority order of the respective nodes in the attack graph is set using at least one of the topology importance evaluated from the aspect of topology, the impact of each vulnerability, and the importance of a host, and the security-enhancing strategy may be established using the set priority order.

Also, in the method for enhancing network security according to an embodiment of the present invention, the network security enhancement apparatus (100 in FIG. 1) delivers a security measure based on the security-enhancing strategy to a corresponding host, whereby the security-enhancing strategy is implemented by taking the security measure at step S407.

Here, software-type security modules, each of which is mapped to a corresponding security-enhancing strategy, are distributed in advance, and the module is run upon each instruction, whereby the security of hosts may be enhanced.

Here, whether to take the measure based on the security-enhancing strategy or which measure is to be taken may be determined either automatically or depending on user input.

Here, when the security-enhancing strategy is implemented depending on user input, available solutions are suggested to a user, and the security-enhancing strategy may be implemented depending on the solution selected by the user.

Also, in the method for enhancing network security according to an embodiment of the present invention, the network security enhancement apparatus (100 in FIG. 1) determines at step S409 whether a termination instruction is input.

When it is determined at step S409 that no termination instruction is input, the process returns to the step (S401) of collecting information, and the security-enhancing process is performed.

When it is determined at step S409 that a termination instruction is input, the security-enhancing process is terminated.

Figure 5:
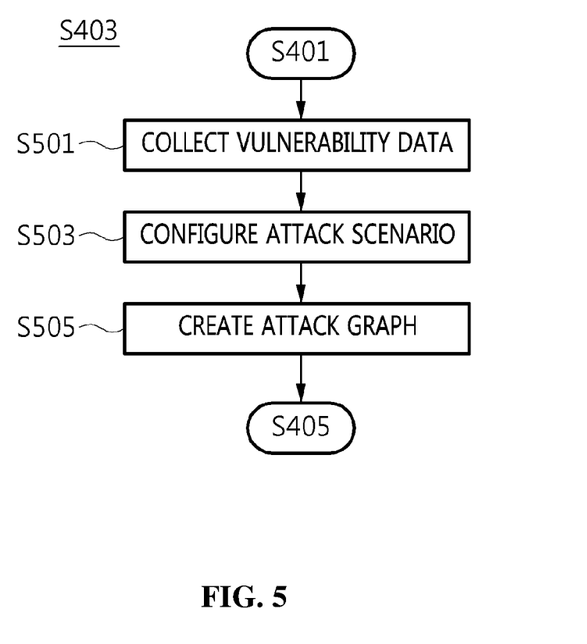
FIG. 5 is a flowchart that shows an example of the step of analyzing an attack surface illustrated in FIG. 4.

FIG. 5 is a flowchart that shows an example of the step (S403) of analyzing attack surfaces, illustrated in FIG. 4.

Referring to FIG. 5, in the step (S403) of analyzing attack surfaces, illustrated in FIG. 4, vulnerability data are collected at step S501.

Here, the vulnerability data may be collected from a vulnerability database.

Also, in the step (S403) of analyzing attack surfaces, illustrated in FIG. 4, an attack scenario is configured at step S503.

Here, the attack scenario may be configured by combining conditions that are exploitable by an attacker from the outset of an attack with the final attack targets.

Here, the attack scenario may be specified depending on user input, or may be automatically created as a combination of hosts on a network.

Also, in the step (S403) of analyzing attack surfaces, illustrated in FIG. 4, an attack graph is created at step S505.

Here, the attack graph may be created using the collected host state information, the collected network connectivity information, the collected vulnerability data, the attack scenario, and the like.

In an alternative embodiment, among the above steps S501, S503, and S505, collecting vulnerability data at step S501 and configuring an attack scenario at step S503 may be performed in parallel.

In an alternative embodiment, among the above steps S501, S503, and S505, configuring an attack scenario at step S503 may be performed before collecting vulnerability data at step S501.

Figure 6:
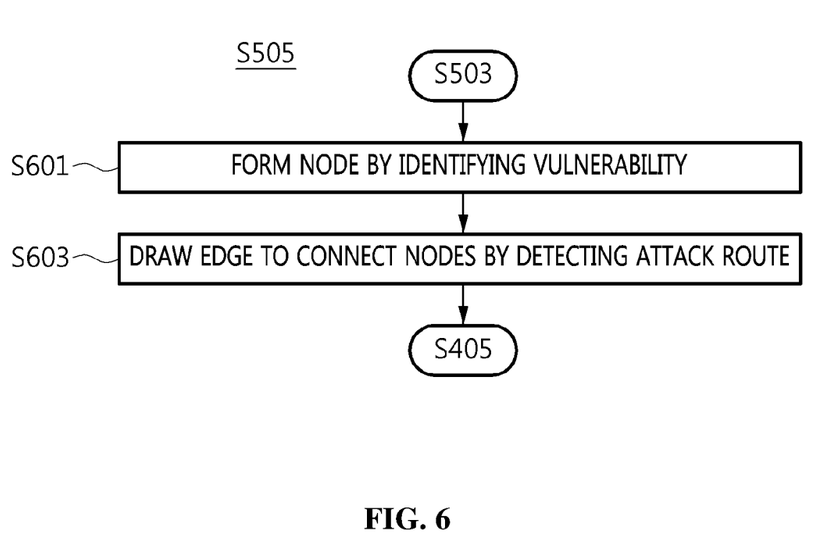
FIG. 6 is a flowchart that shows an example of the step of creating an attack graph illustrated in FIG. 5.

FIG. 6 is a flowchart that shows an example of the step (S505) of creating an attack graph, illustrated in FIG. 5.

Referring to FIG. 6, in the step (S505) of creating an attack graph, illustrated in FIG. 5, vulnerabilities of hosts are identified, whereby nodes are created at step S601.

Here, vulnerabilities that are present in a host are identified by comparing information about software installed in the host with data in the vulnerability database, and a pair comprising the identified vulnerability and a corresponding host may form a single node.

Also, in the step (S505) of creating an attack graph, illustrated in FIG. 5, an edge connects nodes that are associated with each other at step S603 using network connectivity information.

Here, this step is regarded as the step of drawing an effective attack route by extracting the actually exploitable vulnerabilities from among the identified vulnerabilities.

Figure 7:
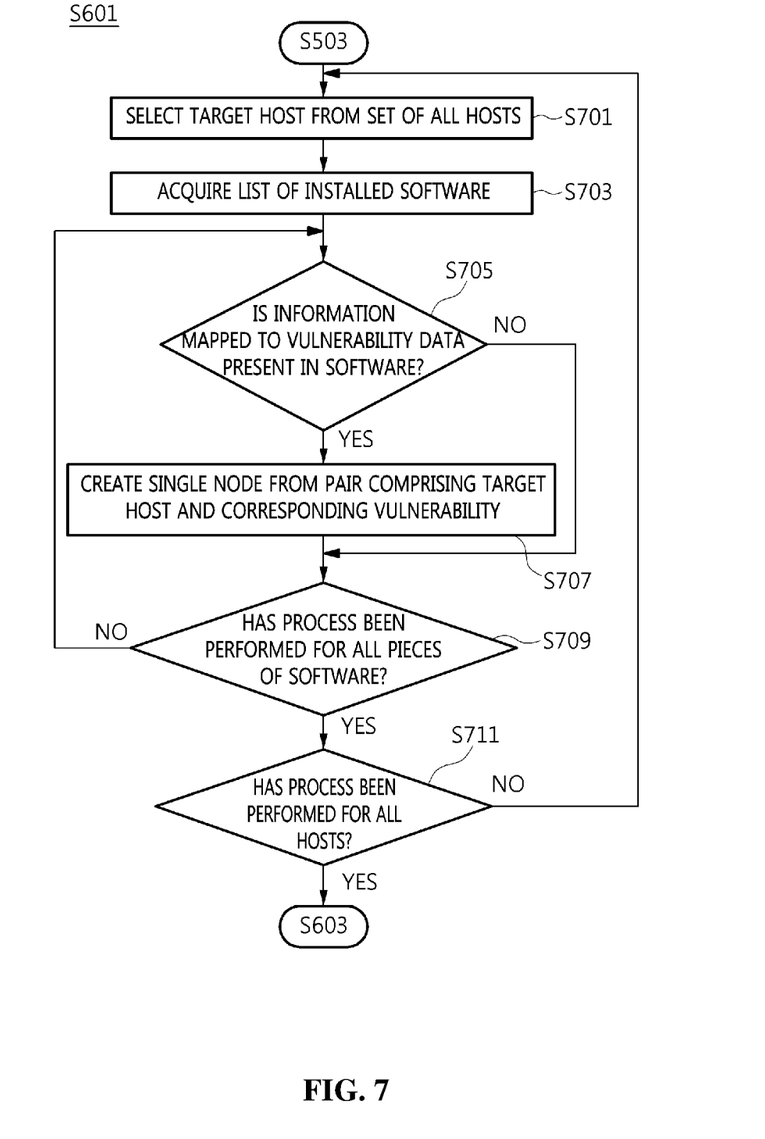
FIG. 7 is a flowchart that shows an example of the step of forming a node of an attack graph illustrated in FIG. 6.

FIG. 7 is a flowchart that shows an example of the step (S601) of forming nodes of an attack graph, illustrated in FIG. 6.

Referring to FIG. 7, in the step (S601) of forming nodes of an attack graph, illustrated in FIG. 6, a single host, selected from a set of hosts, is set as a target host at step S701.

Also, in the step (S601) of forming nodes of an attack graph, illustrated in FIG. 6, a list of software installed in the target host is acquired at step S703.

Also, in the step (S601) of forming nodes of an attack graph, illustrated in FIG. 6, whether information mapped to software vulnerability data is present in the target software, selected from the software list, is determined at step S705.

When it is determined at step S705 that information mapped to software vulnerability data is present in the target software, a pair comprising the target host and the mapped vulnerability forms a single node at step S707.

When it is determined at step S705 that information mapped to software vulnerability data is not present in the target software, a node for the target host is not formed.

Also, in the step (S601) of forming nodes of an attack graph, illustrated in FIG. 6, whether the process of forming nodes is performed for all pieces of software included in the software list of the target host is determined at step S709.

When it is determined that the process of forming nodes has not yet been performed for all pieces of software included in the software list of the target host, software, for which the process of creating a node has not been performed, is selected as target software, and the process returns to the step (S705) of determining whether information mapped to software vulnerability data is present in the target software.

When it is determined at step S709 that the process of forming nodes has been performed for all pieces of software included in the software list of the target host, whether the process of forming nodes has been performed for all hosts is determined at step S711.

When it is determined at step S711 that the process of forming nodes has not yet been performed for all of the hosts, the process returns to the step (S701) of selecting a host, for which the process of forming nodes has not been performed, as a target host.

When it is determined at step S711 that the process of forming nodes has been performed for all of the hosts, the process of forming nodes of an attack graph is terminated.

Figure 8:
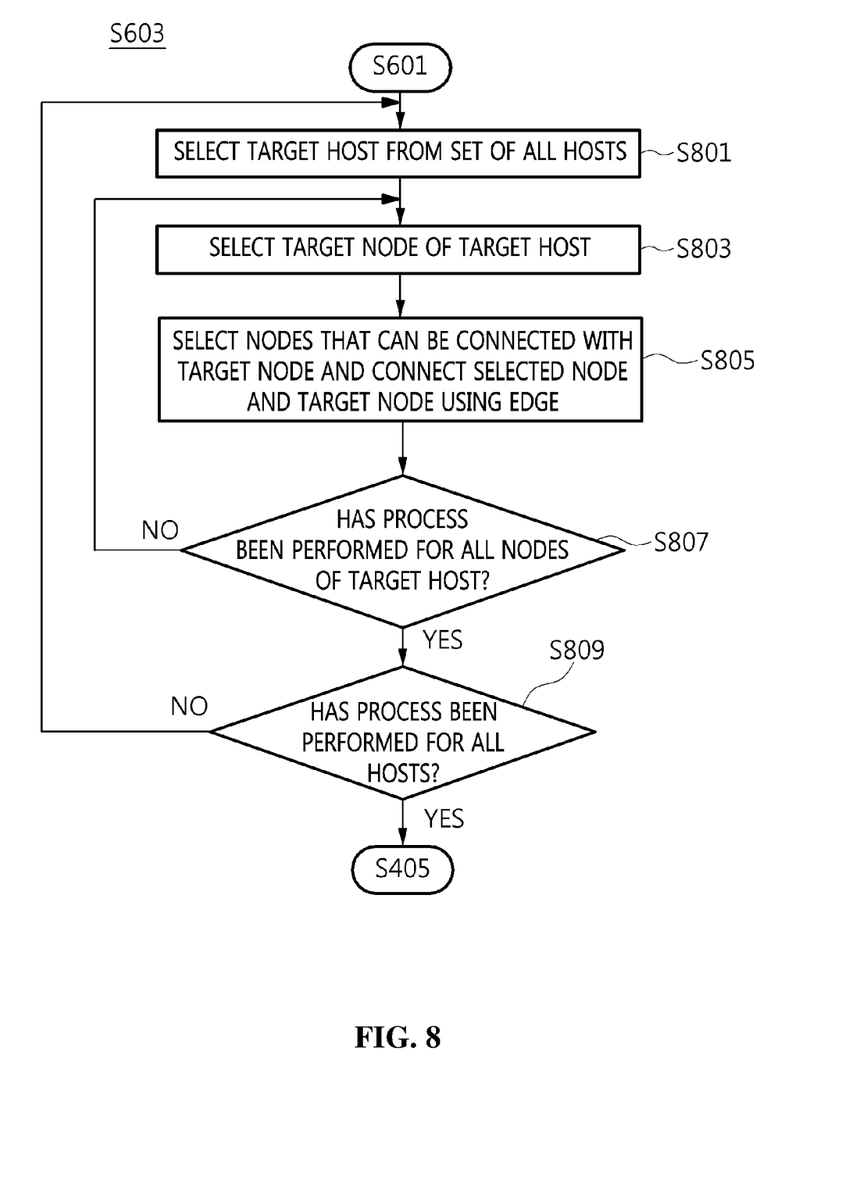
FIG. 8 is a flowchart that shows an example of the step of forming an edge of an attack graph illustrated in FIG. 6.

FIG. 8 is a flowchart that shows an example of the step (S603) of forming edges of an attack graph, illustrated in FIG. 6.

Referring to FIG. 8, in the step (S603) of forming edges of an attack graph, illustrated in FIG. 6, a single host, selected from a list of all hosts, is set as a target host at step S801.

Also, in the step (S603) of forming edges of an attack graph, illustrated in FIG. 6, a single node is selected as a target node, from among all of the nodes of the target host, at step S803.

Also, in the step (S603) of forming edges of an attack graph, illustrated in FIG. 6, nodes that can be connected with the target node are determined and connected therewith using an edge at step S805.

Also, in the step (S603) of forming edges of an attack graph, illustrated in FIG. 6, whether the process of forming edges has been performed for all of the nodes of the target host is determined at step S807.

When it is determined at step S807 that the process of forming edges has not yet been performed for all of the nodes of the target host, the process returns to the step (S803) of selecting a target node from among the nodes of the target host.

When it is determined at step S807 that the process of forming edges has been performed for all of the nodes of the target host, whether the process of forming edges has been performed for all of the hosts is determined at step S809.

When it is determined at step S809 that the process of forming edges has not yet been performed for all of the hosts, the process returns to the step (S801) of selecting a target host from the set of all hosts.

When it is determined at step S809 that the process of forming edges has been performed for all of the hosts, the process of forming edges of an attack graph is terminated.

The above-described embodiment of the present invention may be implemented as program instructions executable by various computer devices, and may be recorded in computer-readable storage media. The computer-readable storage media may, separately or collectively, include program instructions, data files, data structures, and the like. The program instructions recorded in the computer-readable storage media may be specially designed and configured for the embodiment, or may be available by being well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter. The above-mentioned hardware device may be configured such that it operates as one or more software modules in order to perform the operations of the embodiment, and vice-versa.

Figure 9:
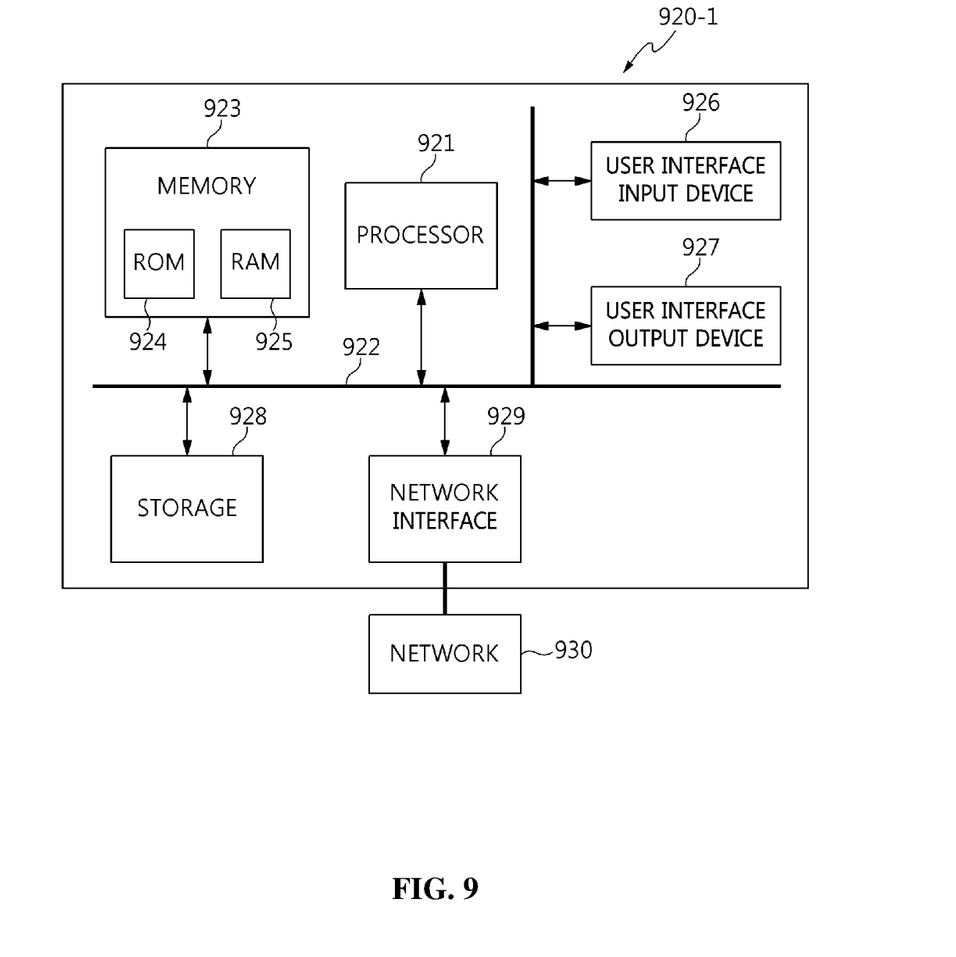
FIG. 9 is an embodiment of the present invention implemented in a computer system.

An embodiment of the present invention may be implemented in a computer system, e.g., as a computer readable medium. As shown in FIG. 9, a computer system 920-1 may include one or more of a processor 921, a memory 923, a user interface input device 926, a user interface output device 927, and a storage 928, each of which communicates through a bus 922. The computer system 920-1 may also include a network interface 929 that is coupled to a network 930. The processor 921 may be a central processing unit (CPU) or a semiconductor device that executes processing instructions stored in the memory 923 and/or the storage 928. The memory 923 and the storage 928 may include various forms of volatile or non-volatile storage media. For example, the memory may include a read-only memory (ROM) 924 and a random access memory (RAM) 925.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention, through an apparatus and method for enhancing network security, information about the states of hosts on a network and connectivity information are continually collected, attack surfaces are analyzed, and a strategy for responding thereto is established and implemented, whereby network security may be efficiently enhanced.

Also, through the apparatus and method for enhancing network security, when a change is caused in a host, a network, or vulnerability data, the present invention automatically performs security assessment and takes a measure for responding thereto, whereby security may be enhanced constantly and dynamically.

Although specific embodiments have been described in the specification, they are not intended to limit the scope of the present invention. For the conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:
1. An apparatus for enhancing network security, comprising:
an information collection unit configured to collect information about states of hosts that form a network and information about connectivity in the network;

an attack surface analysis unit configured to analyze attack surfaces by creating an attack graph using the information about the states and the information about connectivity;

a security-enhancing strategy establishment unit configured to establish a security-enhancing strategy based on the attack graph by setting a priority order of respective nodes in the attack graph; and a security-enhancing strategy implementation unit configured to deliver a measure based on the security-enhancing strategy to a corresponding host, thereby taking a security-enhancing measure.

2. The apparatus of claim 1, further comprising:
a vulnerability database for storing vulnerability data,
wherein the attack surface analysis unit uses the vulnerability data stored in the vulnerability database when creating the attack graph.

3. The apparatus of claim 2, wherein the information collection unit again collects information about states of the hosts and information about connectivity in the network after the security-enhancing measure is taken, whereby attack surfaces are analyzed again and a measure for responding thereto is taken.

4. The apparatus of claim 3, wherein the attack surface analysis unit creates nodes by identifying vulnerabilities of the hosts and draws an edge to connect nodes that are associated with each other using the connectivity information when creating the attack graph.

5. An apparatus for enhancing network security, comprising:
an information collection unit configured to collect information about states of hosts that form a network and information about connectivity in the network;

an attack surface analysis unit configured to analyze attack surfaces by creating an attack graph using the information about the states and the information about connectivity;

a security-enhancing strategy establishment unit configured to establish a security-enhancing strategy based on the attack graph; and a security-enhancing strategy implementation unit configured to deliver a measure based on the security-enhancing strategy to a corresponding host, thereby taking a security-enhancing measure, wherein the security-enhancing strategy establishment unit sets a priority order of respective nodes in the attack graph using at least one of topology importance evaluated from an aspect of topology, an impact of each vulnerability, and importance of a host, and establishes the security-enhancing strategy using the priority order.

6. The apparatus of claim 5, wherein the security-enhancing strategy implementation unit determines whether to take a measure based on the security-enhancing strategy and which strategy to take, either automatically or depending on input from a user.

7. The apparatus of claim 6, wherein the security-enhancing strategy implementation unit provides available solutions to the user and takes a measure based on a solution selected depending on the input from the user.

8. The apparatus of claim 2, wherein the vulnerability database collects vulnerability data from other vulnerability databases and stores the collected vulnerability data therein.

9. The apparatus of claim 8, wherein:
the attack surface analysis unit uses attack scenarios when creating the attack graph, and the attack scenarios are configured by combining conditions that are exploitable by an attacker at an outset of an attack with final attack targets.

10. The apparatus of claim 9, wherein the attack scenarios are specified by user input or are automatically created using a combination of hosts on the network.

11. A method for enhancing network security, comprising:
collecting information about states of hosts that form a network and information about connectivity in the network;

analyzing attack surfaces by creating an attack graph using the information about the states and the information about connectivity;

establishing a security-enhancing strategy based on the attack graph by setting a priority order of the respective nodes in the attack graph; and delivering a measure based on the security-enhancing strategy to a corresponding host, thereby taking a security-enhancing measure.

12. The method of claim 11, wherein analyzing the attack surfaces is configured to use vulnerability data stored in a vulnerability database when the attack graph is created.

13. The method of claim 12, wherein collecting the information is configured to again collect information about states of the hosts and information about connectivity in the network after the security-enhancing measure is taken, whereby attack surfaces are analyzed again and a measure for responding thereto is taken.

14. The method of claim 13, wherein analyzing the attack surfaces is configured to create nodes by identifying vulnerabilities of the hosts and to draw an edge to connect nodes that are associated with each other using the connectivity information when the attack graph is created.

15. The method of claim 14, wherein the security-enhancing strategy is configured to set the priority order of respective nodes in the attack graph using at least one of topology importance evaluated from an aspect of topology, an impact of each vulnerability, and importance of a host, and to establish the security-enhancing strategy using the priority order.

16. The method of claim 15, wherein taking the security-enhancing measure is configured to determine whether to take a measure based on the security-enhancing strategy and which strategy to take, either automatically or depending on input from a user.

17. The method of claim 16, wherein taking the security-enhancing measure is configured to provide available solutions to the user and to take a measure based on a solution selected depending on the input from the user.

18. The method of claim 17, wherein the vulnerability database collects vulnerability data from other vulnerability databases and stores the collected vulnerability data therein.

19. The method of claim 18, wherein:
analyzing the attack surfaces is configured to use attack scenarios when the attack graph is created, and the attack scenarios are configured by combining conditions that are exploitable by an attacker at an outset of an attack with final attack targets.

20. The method of claim 19, wherein the attack scenarios are specified by user input or are automatically created using a combination of hosts on the network.

21. The apparatus of claim 1, wherein the security-enhancing strategy is based on the attack graph by setting the priority order of the respective nodes in the attack graph using at least one of topology importance evaluated from an aspect of topology, an impact of each vulnerability, and importance of a host, and to establish the security-enhancing strategy using the priority order.

\* \* \* \* \*